US007024402B2

(12) United States Patent
Morimoto et al.

(10) Patent No.: US 7,024,402 B2
(45) Date of Patent: Apr. 4, 2006

(54) SPATIAL DATA MINING METHOD, SPATIAL DATA MINING APPARATUS AND STORAGE MEDIUM

(75) Inventors: Yasuhiko Morimoto, Yamato (JP); Harunobu Kubo, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 09/825,013

(22) Filed: Apr. 3, 2001

(65) Prior Publication Data

US 2001/0051947 A1    Dec. 13, 2001

(30) Foreign Application Priority Data

May 9, 2000 (JP) .............................. 2000-135928

(51) Int. Cl.
*G06F 7/00* (2006.01)
(52) U.S. Cl. .................. 707/3; 707/4; 707/5; 707/102; 707/103 R
(58) Field of Classification Search .................... 707/2, 707/100, 3, 4, 5, 102, 103 R
See application file for complete search history.

(56) References Cited

U.S. PATENT DOCUMENTS

| | | | | |
|---|---|---|---|---|
| 5,457,439 A | * | 10/1995 | Kuhn | 340/435 |
| 5,644,656 A | * | 7/1997 | Akra et al. | 382/215 |
| 6,178,380 B1 | * | 1/2001 | Millington | 701/212 |
| 6,192,164 B1 | * | 2/2001 | Park | 382/300 |
| 6,366,851 B1 | * | 4/2002 | Chojnacki et al. | 701/208 |
| 6,381,605 B1 | * | 4/2002 | Kothuri et al. | 707/100 |
| 6,397,208 B1 | * | 5/2002 | Lee | 707/3 |
| 6,484,160 B1 | * | 11/2002 | Richard et al. | 707/2 |
| 6,498,982 B1 | * | 12/2002 | Bellesfield et al. | 701/202 |
| 6,529,143 B1 | * | 3/2003 | Mikkola et al. | 340/995.1 |

OTHER PUBLICATIONS

Ester et al., Clustering for Mining in Large Spatial Databases, published 1998, pp. 1-7.*
Knorr et al., Finding Aggregate Proximity Relationships and Commonalities in Spatial Data Mining, IEEE transactions on knowledge and data engineering, vol. 8, No. 6, Dec. 1996, pp. 884-897.*

(Continued)

*Primary Examiner*—Jeffrey A. Gaffin
*Assistant Examiner*—Hung Pham
(74) *Attorney, Agent, or Firm*—Anne Vachon Dougherty

(57) ABSTRACT

A spatial data mining apparatus for calculating an optimal distance from a database, wherein spatial information, such as addresses, is stored, includes an input mechanism, for the input of an objective function required for the optimization of a distance, an intermediate table generator 30, for employing in the database starting point data and query point data for calculating the distances between each starting point and each query point and for generating an intermediate table, and an optimal distance calculator for calculating a distance based on the intermediate table generated by the intermediate table generator, in order to optimize the value of the objective function that is entered by the input mechanism.

2 Claims, 15 Drawing Sheets

OTHER PUBLICATIONS

Roussopoulos et al., Nearest Neighbor Queries, Proceedings of the 1995 ACM SIGMOD international conference on Management of data, pp. 71-79.*

Andre Frank, MAPQUERY: DataBase Query Language for Retrieval of Geometric Data and their Graphical Representation, Proceedings of the 9th annual conference on Computer graphics and interactive techniques, copyright 1982, pp. 199-207.*

GIS (Geographical Information System) "Spatial Data Mining Progress and Challenges" (SIGMON'96 Data Mining Workshop, pp. 55-60, 1996.

"Geometrical Clustering and Data Mining" IPSJ p. 1-291 and p. 1-292.

"A Query Processing with Attribute Orientated Induction in Spatial-Temporal Databases" SIG-FAI-970 1 p. 42-47.

* cited by examiner

Fig. 4

Example database

Post office schema = (ID, position (coordinate), *type*)

School schema = (ID, position (coordinate), *type*)

Police station schema = (ID, position (coordinate), *type*)

Train station schema = (ID, position (coordinate), passenger count, *transfer station or not*)

Convenience store schema = (ID, position (coordinate), sales, *store name*)

Customer schema = (ID, position (coordinate), age, *sex*, annual income, *occupation*)

ATM schema = (ID, position (coordinate), average withdrawal, average operation times)

Crime schema = (ID, position (coordinate), *type*)

——— Numerical attribute
——— Categorical attribute

Fig. 7

Define objective function

"Customer schema"
(Maximized distance for the "average annual incomes" of customers having support rate of S or higher)
"Customer schema"
(Maximized distance for customer rates of "age of 60 or older" having support rate of S or higher)
"Customer schema"
(Minimized distance for a square error of "average annual incomes")
"Customer schema"
(Maximized distance for mutual amount of "sex" information)
"ATM schema"
(Maximized distance for "ATM count/customer count" having support rate of S or higher)

―――― Numerical (or derived as numerical value) attribute

――― Categorical (or derived as categorical value) attribute

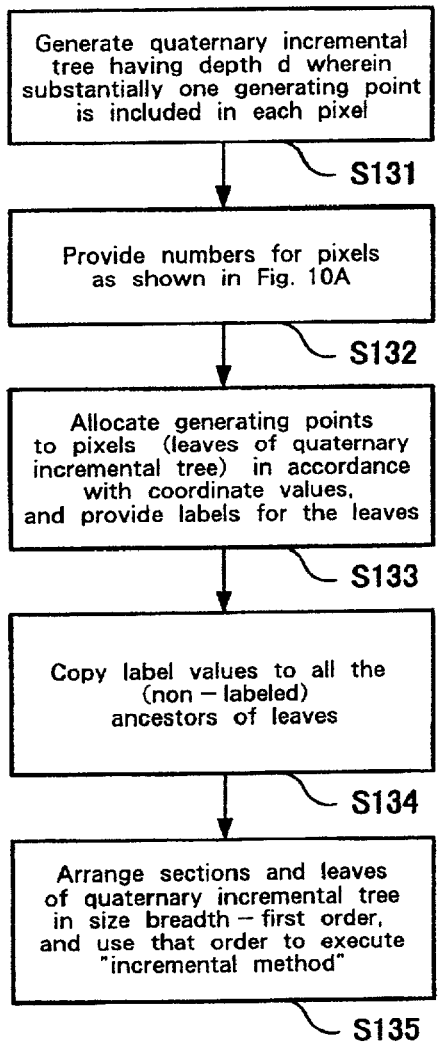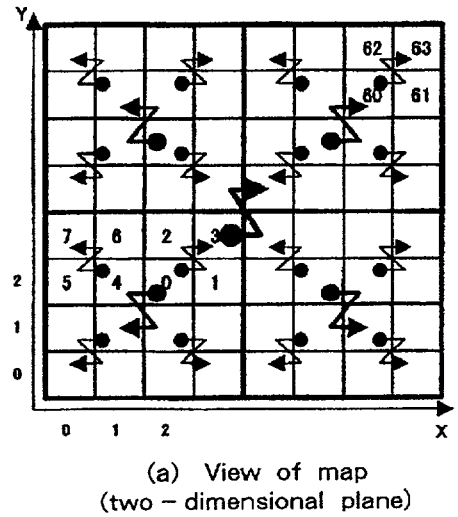
(a) View of map
(two – dimensional plane)
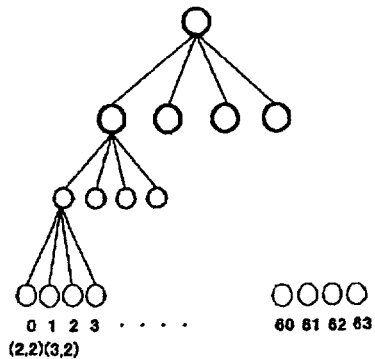
(b) View of quaternary incremental tree
Fig. 10

SPATIAL DATA MINING METHOD, SPATIAL DATA MINING APPARATUS AND STORAGE MEDIUM

FIELD OF THE INVENTION

The present invention relates to the processing performed for the spatial data mining of databases, and more specifically, relates to a method and an apparatus for the calculation of optimal distances or optimal orientations, which is the basic function of spatial data mining.

BACKGROUND OF THE INVENTION

A new processing technique has been introduced whereby spatial information, such as address data, in large databases can be interpreted by applying spatial context and spatial rules. But since present day spatial data mining requires expensive spatial/geometrical calculations involving a huge amount of data, and since extremely difficult technical problems are frequently encountered, spatial data mining has not been well studied and remains an underdeveloped field. However, spatial data mining is considered to be a feasible basic technique that can greatly assist in the development of databases for the information industry or for the GIS (Geographical Information System) field which have huge volumes of business. Spatial data mining, and associated techniques, is further considered to be a field having the potential to provide many benefits for businesses.

Conventional spatial data mining systems, used for determining distances in advance through the introduction of correlated spatial rules, are well known. According to a method proposed by J. Han, et. al ("Spatial Data Mining: Progress and Challenges", SIGMOD '96 Data Mining Workshop, pp. 55–69, 1996), for example, distance predicate terms "close to" and "far from" are defined, and correlated spatial rules, including the following two, are introduced from a spatial information database:

"close to a park"→"residential area" (support rate 5%, confidence rate 80%)

"drop in land price"→"far from a station" (support rate 10%, confidence rate 70%)

Further, another conventional spatial data mining system for determining an orientation rule in advance for the introduction of a correlated spatial rule is also well known. According to the above method proposed by J. Han, et. al, spatial orientation terms "west of" and "north of" are defined, and correlated spatial rules, including the following spatial orientation predicated ones, can be introduced from a spatial information database:

"west of a park"→"residential area" (support rate 5%, confidence rate 80%)

"drop in land price"→"north of a station" (support rate 10%, confidence rate 70%).

However, "close to" and "far from", which are included in the method proposed by J. Han, et. al, must be defined before data mining is initiated by providing a distance, such as "close to X"="within a distance Y of X" and "far from X"="farther than a distance Z from X". In addition, "west of" and "north of" must be defined before data mining is initiated by providing a range and an angle, such as "west of X"="the inside of a rectangle one side of which, to the west of X, has a length of Y" and "north of X"="an angle of Y1° to Y2° from X". At this time, a distance such as Y or Z, which is used for optimizing a specific objective function, or a numerical value for strictly determining an angle such as Y1° or Y2°, which is used for optimizing a specific objective function, is requested by many analyzation businesses, and even when the latest conventional techniques are employed, many of those analyzation businesses can not satisfactorily cope with their operation.

Conventional data mining systems can not, for example, cope with a search for "a radius extending outward from a convenience store used to maximize the installation density of automatic teller machines within a unit distance in a district A" or a search to ascertain "the orientation of a route along which heavy air pollution spreads from a garbage disposal area".

SUMMARY OF THE INVENTION

To resolve the above technical shortcomings, it is one object of the present invention to provide a technique for calculating a distance or an orientation requested by analyzation businesses. This technique is different from deriving a correlated spatial rule using distances or orientations which are calculated in advance.

It is another object of the present invention to increase the speed of the spatial data mining processing performed to obtain a distance or an orientation.

It is an additional object of the present invention to provide spatial data mining output results that are useful to users (clients).

To achieve the above objects, according to the present invention, a spatial data mining technique is provided that does not specify distances or spatial orientations in advance in order to introduce a spatial correlative rule, but instead, employs as input parameters the definition of a distance or an orientation, the definition of a set of starting points and the definition of an objective function for obtaining a distance or an orientation that is requested by many analyzation businesses, and that is used for optimizing a specific objective function. Specifically, according to the present invention, a spatial data mining method, for introducing spatial rules from a database in which spatial information, such as addresses, is stored, comprises the steps of: providing from the database a starting point or a starting point group; employing the starting point or the starting point group to define a distance or an orientation; defining an objective function that is examined in order to introduce a spatial rule; and calculating a distance from or an orientation block originating at the starting point or the starting point group in order to optimize the objective function that is defined.

The objective function is a function for which a distance or an orientation requested by an analyzation business is not provided. The spatial data mining method further comprises a step of: entering as input parameters the definition of a distance, the definition of the starting point or the starting point group and the definition of the objective function.

At the step of calculating the distances, an intermediate table is generated based on starting point set data consisting of the starting point group and the objective function, and in accordance with distance values, attribute values for query points in the database are added together, based on the intermediate table. As a result, the calculation time can be considerably reduced.

The spatial data mining method further comprises a step of: displaying on a map the distance or the orientation block relative to the starting point or the starting point group. Then, a user can visually identify the rule acquired by performing the calculation, so that for the user the usability is improved.

The orientation block can be obtained by employing the numerical value of the orientation used to optimize the objective function. Further, a search objective data range, at equal distances from the starting point and from the starting point group, that is appropriate for calculating an orientation can be selected as the orientation block. The calculation from the starting point or the starting point group for an infinite range is almost impossible, and determination of an optimized area is effective.

According to the present invention, a spatial data mining method, for generating a data table used to introduce a spatial rule for the orientation obtained from a spatial information database, comprises the steps of: providing a set of starting points and a set of query points in a database; designating an upper limit for a distance between the set of starting points and the set of query points; calculating a distance between each starting point and each query point; calculating an angle formed between a starting point and a query point whose distance from the starting point does not exceed the designated upper limit; and generating a data table using the angle formed with the starting point. The query points can be a set of points representing customer data, and are employed to actually calculate a distance from or an orientation relative to a starting point or starting point groups.

Furthermore, according to the present invention, a spatial data mining apparatus for calculating an optimal distance from a database, wherein spatial information, such as addresses, is stored, comprises: input means, for the input of an objective function required for the optimization of a distance; intermediate table generation means, for employing in the database starting point data and query point data for calculating the distances between each starting point and each query point and for generating an intermediate table; and optimal distance calculation means, for calculating a distance, based on the intermediate table generated by the intermediate table generation means, in order to optimize the value of the objective function that is entered by the input means.

The intermediate table generation means includes: Voronoi diagram preparation means, for preparing a Voronoi diagram by using the starting point data in the database; distance calculation means, for employing the Voronoi diagram, prepared by the Voronoi diagram preparation means, and the query point data in the database to calculate distances between individual starting points and individual query points and to generate data records; and individual distance calculation means, for selecting an optimization function from among objective functions to be examined, and for adding together record values, collected from the data records, that are required for optimization of each of the distances.

Further, the Voronoi diagram preparation means repeats plane quarter division in accordance with the number of starting points that are entered, sorts the starting points into end plane pixels obtained by division and selects one starting point in each of the end plane pixels as a representative point for the pertinent pixel, prepares a quaternary incremental tree with pixels at individual levels being defined as intermediate nodes, scans the individual nodes of the quaternary incremental tree in the breadth-first order, beginning at the topmost level, and outputs a set of starting points that are positioned in ranks. As a result, high speed processing can be performed.

When the structure of the quaternary incremental tree is calculated in advance and stored in memory, the high-speed mining process for distance optimization or for orientation can be implemented because such a tree structure is frequently used for the mining process.

According to the present invention, a spatial data mining apparatus for calculating an optimal orientation for a database, which includes spatial information, such as addresses, comprises: input means, for the input of an objective function required for the optimization of an orientation; intermediate table generation means, for employing, based on starting point data and query point data in the database, angles of 0 degrees from the starting points in a specific direction to generate an intermediate table in which the orientation of the locations of the query points are included; and optimal orientation calculation means, for calculating, based on the intermediate table generated by the intermediate table generation means, an orientation for optimizing the value of the objective function that is entered by the input means.

The intermediate table generation means includes: Voronoi diagram preparation means, for preparing a Voronoi diagram by using the starting point data in the database; distance calculation means, for employing the Voronoi diagram prepared by the Voronoi diagram preparation means and the query point data in the database to calculate distances between individual starting points and individual query points; orientation calculation means, for calculating, based on the distances obtained by the distance calculation means, orientations of the starting points with the query points that fall within a designated distance upper limit, and for storing the orientations as data records for the intermediate table; and individual orientation calculation means, for selecting an optimization function from among objective functions to be examined, and for collecting and adding record values, from the data records, that are required for optimization of each of the orientations.

According to the present invention, a spatial data mining apparatus, for calculating an optimal distance from or an optimal orientation with a database in which spatial information, such as addresses, is stored, and for outputting the optimal distance or the optimal orientation, comprises: input means, for the input of an objective function for which a distance or an orientation requested by an analyzation business is not provided; optimal distance/orientation calculation means, for employing starting point data and query point data in the database for calculating a distance between, or the orientation of each of the starting points with each of the query points, and for calculating the optimal distance or the optimal orientation for the optimization of the value of the objective function; and display means, for displaying, on the screen of a geographical information system, the optimal distance or the optimal orientation calculated by the optimal distance/orientation calculation means.

The display means can use the optimal distance calculated by the optimal distance/orientation calculation means for the display of circular areas, the centers of which are starting points. The display means can also use the optimal orientation, calculated by the optimal distance/orientation calculation means, for the display of fan-shaped portions of the circular areas, the origins of the fan-shaped portions being the starting points at the centers of the circular areas. Thus, for easy understanding, the obtained optimal distance/orientation can be displayed on maps, so that customer usability can be considerably improved.

According to the present invention, a spatial data mining apparatus, for introducing a spatial rule from a database, which also includes spatial information, such as addresses, comprises: starting point provision means, for providing starting points or starting point groups obtained from the database; objective function definition means for defining an objective function that is to be examined in order to introduce a spatial rule; distance calculation means, for calculating distances originating at the starting points or at the starting point groups for optimizing the objective function that is defined; orientation definition means, for employing the starting points or the starting point groups to define distances or orientations; and orientation block calculation means for calculating orientation blocks beginning at the starting points or the starting point groups to optimize the objective function that is defined.

The spatial data mining apparatus further comprises: starting point/query point provision means for providing a set of starting points and a set of query points in the database; distance upper limit designation means for designating the upper limit for a distance between the set of starting points and the set of query points; distance calculation means for calculating a distance between each starting point and each query point; angle calculation means for calculating an angle formed between a starting point and a query point whose distance from the starting point does not exceed the designated upper limit; and a data table generation means for generating a data table using the angle formed with the starting point.

According to the present invention, a storage medium is provided on which is stored a spatial data mining program, which introduces a spatial rule extracted from a database that includes spatial information, such as addresses, based on an objective function for which neither a distance nor an orientation is provided, the program comprising the steps of: providing a starting point or a starting point group from the database; employing the starting point or the starting point group to define a distance or an orientation; defining an objective function that is to be examined; and calculating a distance measured from the start point or the starting point group, or an orientation block to optimize the objective function that is defined. The storage medium can be a portable medium, such as a CD-ROM, or can be a storage medium such as a hard disk at a program provider on which programs are stored for downloading via a network or a hard disk a user employs to store programs that are so downloaded.

BRIEF DESCRIPTION OF THE DRAWINGS

FIG. 4 is a diagram showing an example database.

FIG. 7 is a diagram showing an example definition for an objective function.

FIG. 10 is a diagram showing the pre-process for the incremental method.

DETAILED DESCRIPTION OF INVENTION

A preferred embodiment of the present invention will now be described in detail while referring to the accompanying drawings.

First, modeling and an algorithm used for the present invention will be described so that the spatial data mining in this embodiment can be easily understood.

Figure 1:
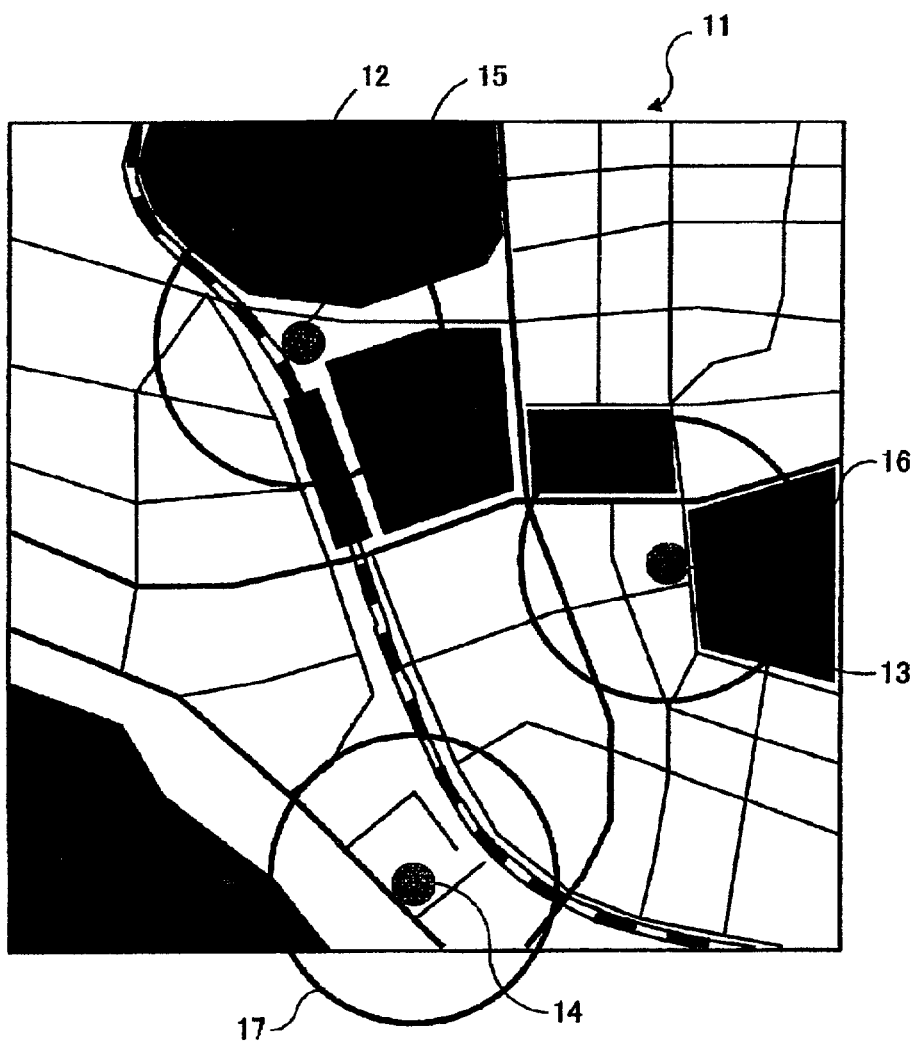
FIG. 1 is a diagram showing a first modeling example output by a distance optimization engine according to one embodiment of the present invention.

FIG. 1 is a diagram showing a first modeling example output for this embodiment by a distance optimization engine. On a map 11, distances (or distance blocks), for the optimization of an objective function, measured from starting points (or a starting point group) 12 to 14, which are convenience stores (CS), constitute the predetermined radii of circles 15 to 17. In the example in FIG. 1, the displayed distances, measured from the starting points 12 to 14, used for the optimization of an objective function were obtained by a search run to determine the "distances from convenience stores within which the bag-snatching occurrence rate is maximized."

In this example for the embodiment, the content output is:
"bag-snatching"→("convenience stores", "[0, 100]"), "five" cases.

This means that at each "convenience store", within a radius of between "0"m and "100"m, the "bag-snatching" occurrence rate is maximized, and that "five" cases occurred within the radius (m).

Figure 2:
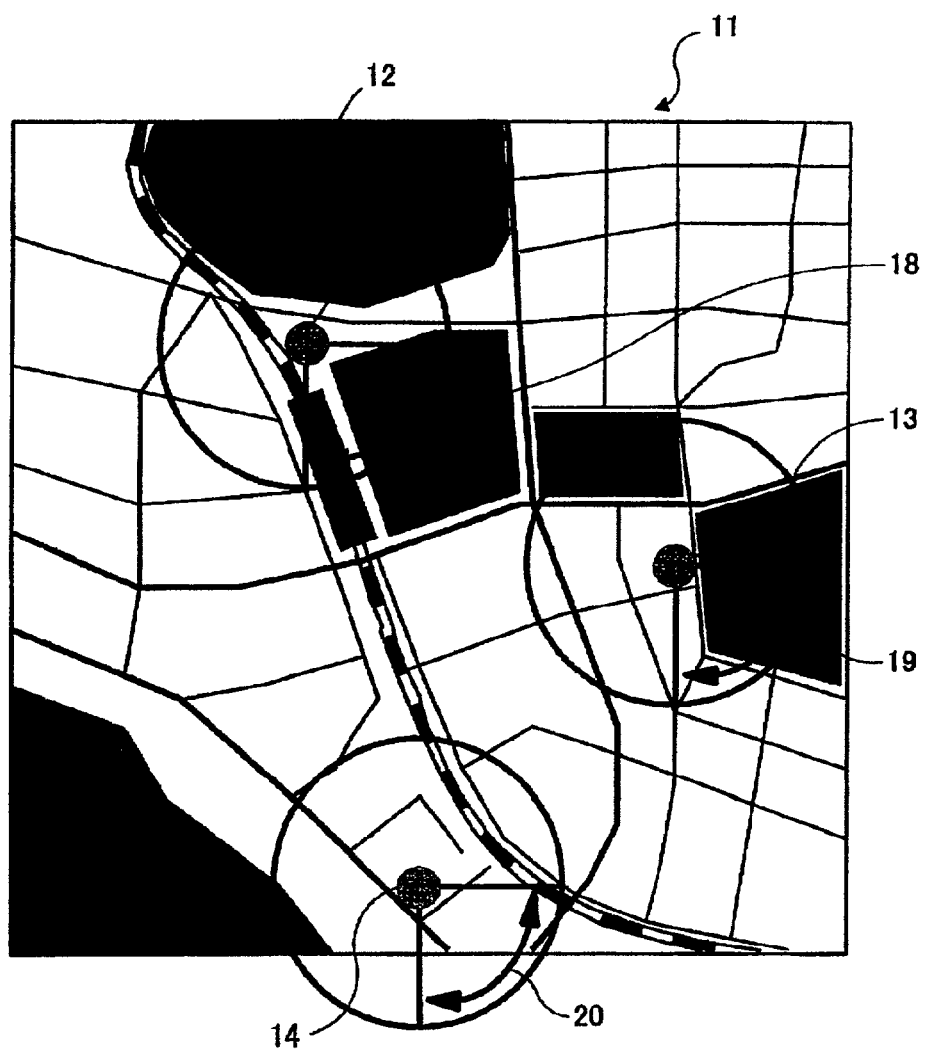
FIG. 2 is a diagram showing a second modeling example output by an orientation optimization engine according to the embodiment of the present invention.

The examples output for the distances from the starting points are as follows:
"bag-snatching"→("station", "[50, 180]"), "6.1" cases
"bag-snatching"→("banks", "[200, –]"), "2.2" cases
"burglary"→("banks", "[60, 200]"), "1.3" cases
"murder"→("restaurants", "[0, 50]"), "0.4" cases FIG. 2 is a diagram showing a second modeling example output for this embodiment by an orientation optimization engine. On the map 11, orientation blocks 18 to 20, for the optimization of the objective function, relative to the starting points (or the starting point group) 12 to 14, the convenience stores (CS), are displayed on the map 11. In the example in FIG. 2, the angles for the fan-shaped areas that are shown were provided by a search conducted to determine "the orientations for areas at the convenience stores within which the bag-snatching occurrence rate is maximized".

In this example, the content output is:
"bag-snatching"→("convenience stores", "[0, 100]"), "five" cases.

This means that within an area having an orientation of "0"° to "100"° the "bag-snatching" occurrence rate is maximized and that for every 10° "five" incidents of "bag-snatching" occurred.

Another example output for the orientation of an area originating at a starting point is:

"bag-snatching"→("shrines", [120, 240]"), "6.1" cases.

Figure 3:
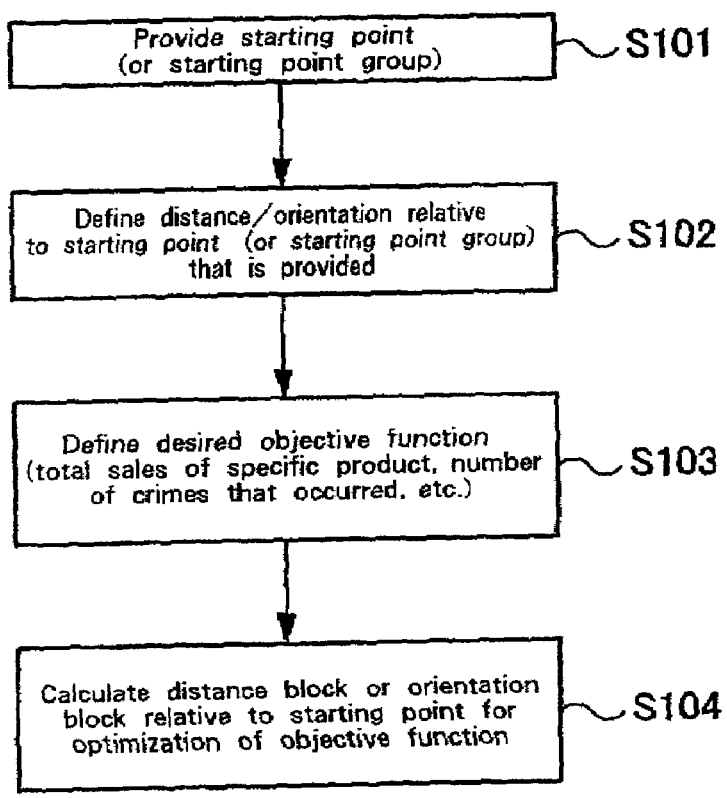
FIG. 3 is a flowchart for explaining an overview of the algorithm of the distance/orientation optimization engine according to the embodiment.

FIG. 3 is a flowchart for explaining an overview of the algorithm used for the distance/orientation optimization engine in accordance with the embodiment. First, a starting point or a starting point group is provided (step 101). That is, for the optimization of a distance, an entity (substance) on a map is designated as a starting point for the calculation of the distance, while to obtain a specific starting point for orientation optimization, an entity on a map is designated an orientation reference point. Either a single or multiple points, defined as a starting point or a set of starting points, may be employed for each calculation. Then, the distance from the starting point (or the starting point group) or the orientation, for which the location of the starting point is provided, is defined (step 102). It should be noted that if the Euclidean distance is defined as distance, no distance definition is required. An objective function is defined for a desired objective, such as the total sales of a specific product or the number of crimes that occurred (step 103). Thereafter, for the optimization of the objective function, calculations are performed for the arrangement, relative to the starting point, of a distance block or an orientation block (step 104). Following this, distance/orientation buckets are collected and added together, and the optimal distance is calculated. When n denotes the number of queries while m denotes the number of starting points, and N=n+m, the average time required for the distance calculation can be represented as O(N). That is, in order to find a starting point corresponding to a query point, the average number of calculations is O(logn), distance is obtained by calculating O(1), and the time required for this process is O(nlogn). When the Euclidean distance is defined, however, the average processing time is determined to be O(n) by using a quaternary incremental calculation method that will be described later. The query point is customer data stored in a target database used for processing.

FIG. 4 is a diagram showing an example database. In this embodiment, it is assumed an integrated geographical information system, which is associated with a database having the schema as shown in FIG. 4, is present. Each schema for the database includes ID information for identifying data and position (coordinate) information. The position information includes address data and coordinate information corresponding to map information. In addition, the underlined numerical attributes and the underlined categorical attributes printed in italics are also included. The mining using the optimization rule for the distance and the orientation is performed in the database.

Figure 5:
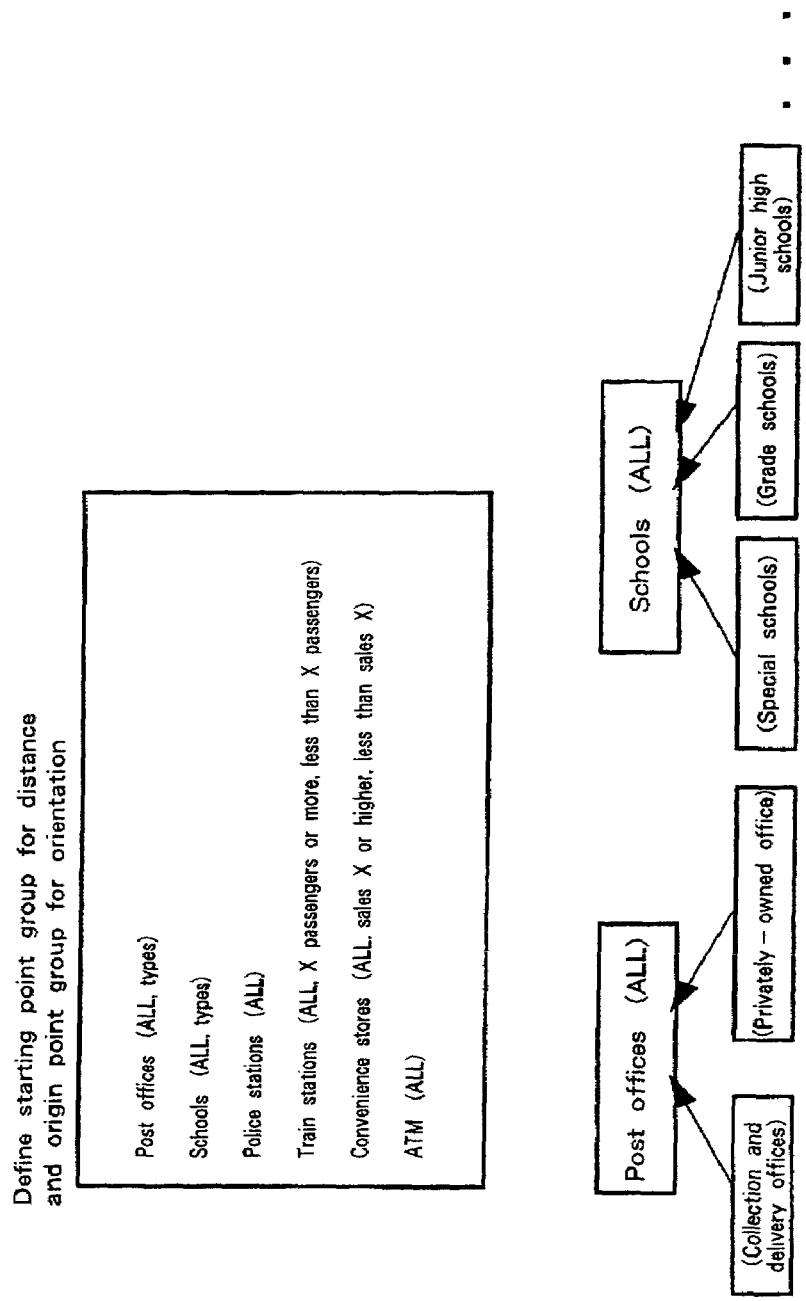
FIG. 5 is a diagram showing example definitions for a staring point group and a reference group used as input parameters.

FIG. 5 is a diagram showing as input parameters example definitions for a starting point group and a reference point group (starting point group for the orientation). In this example, the starting point group for the distance and the starting point group for the orientation at step 101 in FIG. 3 are defined. Also in this example, entities, such as post offices, schools and police stations, are defined and designated as starting points and reference points. For example, post offices (ALL) are defined by totaling a plurality of categorical attributes, such as mail collection and delivery offices and privately-owned post offices. Similarly, schools (ALL) are defined by totaling the categorical attributes, such as various special schools, grade schools and junior high schools. For stations (ALL), a starting point group or a reference point group is defined based on numerical attributes, such as equal to or greater than X number of customers or less than X number of customers. Likewise, convenience stores can be defined based on numerical attributes, such as sales equal to or greater than X or less than X.

Figure 6:
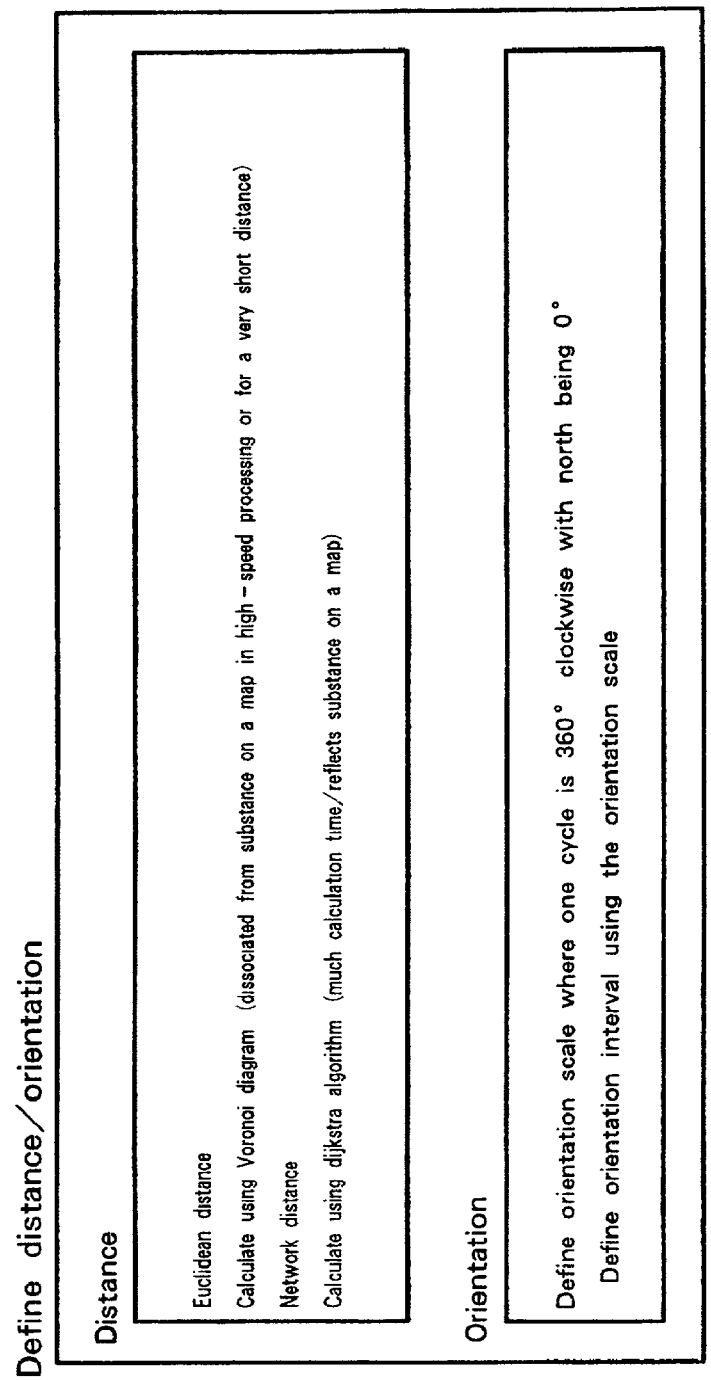
FIG. 6 is a diagram showing example definitions for a distance and an orientation.

FIG. 6 is a diagram showing definition examples for a distance and an orientation, which are performed at step 102 in the flowchart in FIG. 3. These definitions are designated as input parameters for mining performed using the optimization rule. The distance definition is a Euclidean distance or a network distance. The Euclidean distance is calculated using a Voronoi diagram; however, for high-speed calculations or for a very short distance, the obtained distance value would be dissociated from the object represented on a map. The network distance is obtained using the Dijkstra algorithm. In accordance with the Dijkstra algorithm, while the shortest distance to each node is obtained beginning at the periphery of the start node, the range is gradually expanded, until finally, the shortest distance for all the nodes is obtained. An extended period of time is required for the calculations; however, the object represented on a map can be reflected. In this embodiment, the calculation method used for the Euclidean distance is employed, which differs from the calculation method used for the other types of distances. No distance definition is required to obtain the Euclidean distance. And for orientation, an orientation scale having one clockwise cycle of 360°, with north defined as 0°, is employed for defining an orientation block.

FIG. 7 is a diagram showing a definition example for the objective function, which is the definition given at step 103 in the flowchart in FIG. 3. The objective function is designated for mining for which the optimization rule is used. The objective function can be defined based on the underlined numerical (or derived as numerical values) attributes for the individual schema and the underlined categorical (or derived as category values) attributes printed in italics. For example, as a customer schema, a numerical attribute can be used to define a "maximized distance for the 'average year income' of customers having a support rate of S or higher", or the categorical attribute can be used to define a "maximized distance for the ratio of customers that are 'sixty years old or older' having a support rate of S or higher". In addition, as the ATM schema, the categorical attribute can be employed to define a "maximized distance for an 'ATM count/customer count' obtained for customers having a support rate of S or higher."

At step 104 in the flowchart in FIG. 3, the distance block from or the orientation block relative to the starting point for the optimization of the defined objective function is obtained. In this embodiment, an intermediate table is prepared for high-speed processing, as will be described later. For the intermediate table, a voronoi diagram (Thiessen division), which is a geometric figure for which a set of starting points are provided as generating points, is prepared using the incremental method. That is, a Voronoi diagram $V_{m+1}$ including m+1 points is prepared by adding a new generating point $P_{m+1}$ to a Voronoi diagram $V_m$ in which generating points $P_1$ to $P_m$ are included.

Figure 8:
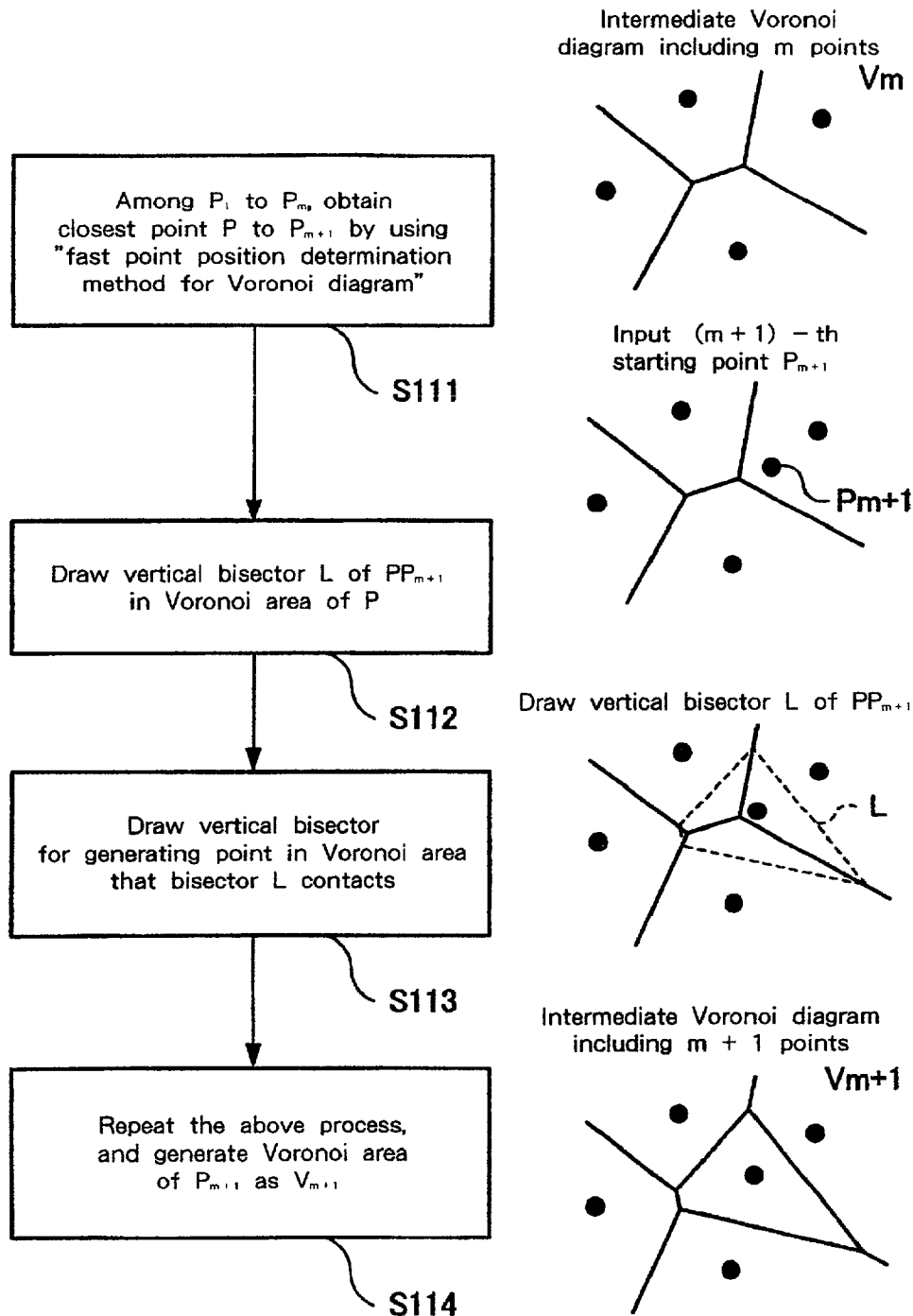
FIG. 8 is a diagram showing processing for which an incremental method is used.

FIG. 8 is a diagram showing the processing performed by the incremental method. The processing is shown in the flowchart on the left, and the preparation procedure used for the Voronoi diagram is shown on the right. First, from among the points $P_1$ to $P_m$, the closest point P to $P_{m+1}$ is obtained using the "fast point position determination method for the Voronoi diagram", which will be described later (step 111). Then, a vertical bisector L of $PP_{m+1}$ is drawn in the Voronoi area of the point P (step 112). Thereafter, a vertical bisector is also drawn for the generating point in the Voronoi area contacted by the line L (step 113). This processing is repeated, and the Voronoi area for the point $P_{m+1}$ is prepared and defined as $V_{m+1}$ (step 114).

Figure 9:
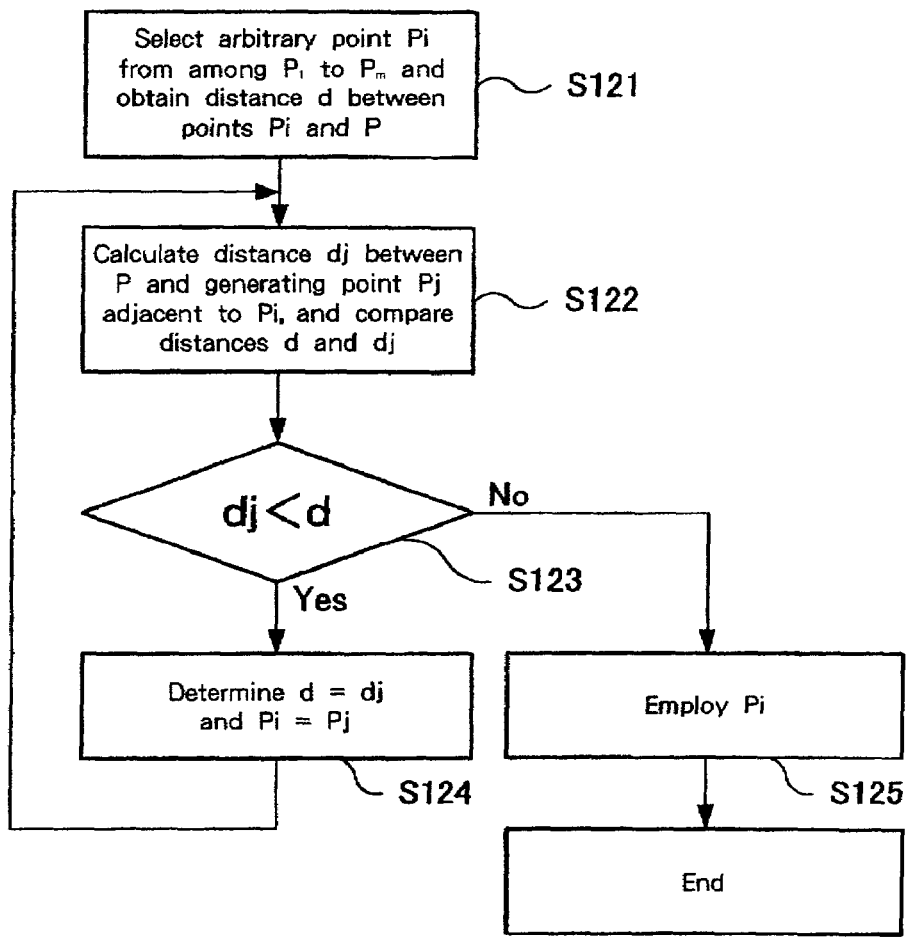
FIG. 9 is a diagram showing the processing for a Voronoi diagram for which a point position determination method is used.

FIG. 9 is a flowchart showing the processing performed by the point position determination method for the Voronoi diagram. According to this method, in the Voronoi diagram $V_m$, which includes the generating points $P_1$ to $P_m$, the closest generating point to a specific point P is obtained (a Voronoi area wherein the specific point P is located is obtained). First, a specific point Pi is selected from among the points $P_1$ to $P_m$, and the distance d between the point P is obtained (step 121). Then the distance dj between the generating point Pj adjacent to the point Pi and the point P is calculated and compared with the distance d (step 122). When dj<d is determined (step 123), d=dj and Pi=Pj are defined, and program control returns to step 122. When no such generating point is present, Pi is regarded as the generating point (step 125) and the processing is thereafter terminated.

FIG. 10 is a diagram showing the pre-processing performed using the incremental method. First, a quaternary incremental tree having a depth d is prepared wherein a generating point is substantially included in each pixel (step 131). Then, numbers are provided for the pixels as is shown in FIG. 10(a) (step 132). Shown in FIG. 10(a) is a view of a map (two-dimensional plane) on which arrows are used to indicate the order used for providing pixel numbers. The generating points are allocated for the pixels (the leaves of the quaternary incremental tree) in accordance with coordinate values, and labels are provided for the leaves (step 133). The labels of the leaves are copied for all the ancestors (non-labeled) of the leaves (step 134). Finally, the sections and leaves of the quaternary incremental tree are arranged in the breadth-first order, which is used for the "incremental method" that is employed (step 135). A view of a quaternary incremental tree having a depth of 3 is shown in FIG. 10(b), and for this tree the order used for the incremental method is not that which corresponds to the depth, but is that which corresponds to the transverse direction. It should be noted that the Voronoi diagram may be prepared in advance for the entities on a map, such as train stations, post offices, police stations, schools and parks, that tend to be analysis targets and that do not move.

The distance from the starting point using the Voronoi diagram is calculated. For this processing, the "resolving of a point position determination problem for n query points using a Voronoi diagram $V_m$ consisting of m generating points $P_1$ to $P_m$" is performed. That is, the distance between each of n (a considerable number) query points (e.g., crime data) and each of a set of m starting points (convenience stores) is calculated. It should be noted that the obtained distance is the distance from the closest starting point. More specifically, the first query point at each pixel is calculated by using a generating point that serves as a label for the pertinent pixel at the succeeding point. The other query point at each pixel is calculated by using the generating point that is determined to be the closest point using the preceding distance/orientation calculation. In this manner, the intermediate table is generated.

Finally, the buckets for the distances or orientations are collected and added, and the optimal distance is calculated. For this processing, the attribute values of the individual n (a considerable number) query points are collected and added in accordance with the distance/orientation value. That is, the "data count" and the data required for the calculation of the objective function value are collected for each bucket. For example, for the objective function of a "customer schema" (the maximized distance for the "average yearly incomes" of customers having a support rate of S or higher), a data count and a total annual income value that are consonant with the distance are sequentially added, and the aggregate is output. When the aggregate information is swept once, the optimized distance is obtained. This result is displayed as a circle or as a fan-shapes area on the map, as is shown in FIG. 1 or 2.

This completes the explanation for the algorithm for the processing performed in this invention. The processing algorithm can be provided and executed as a computer program.

Figure 11:
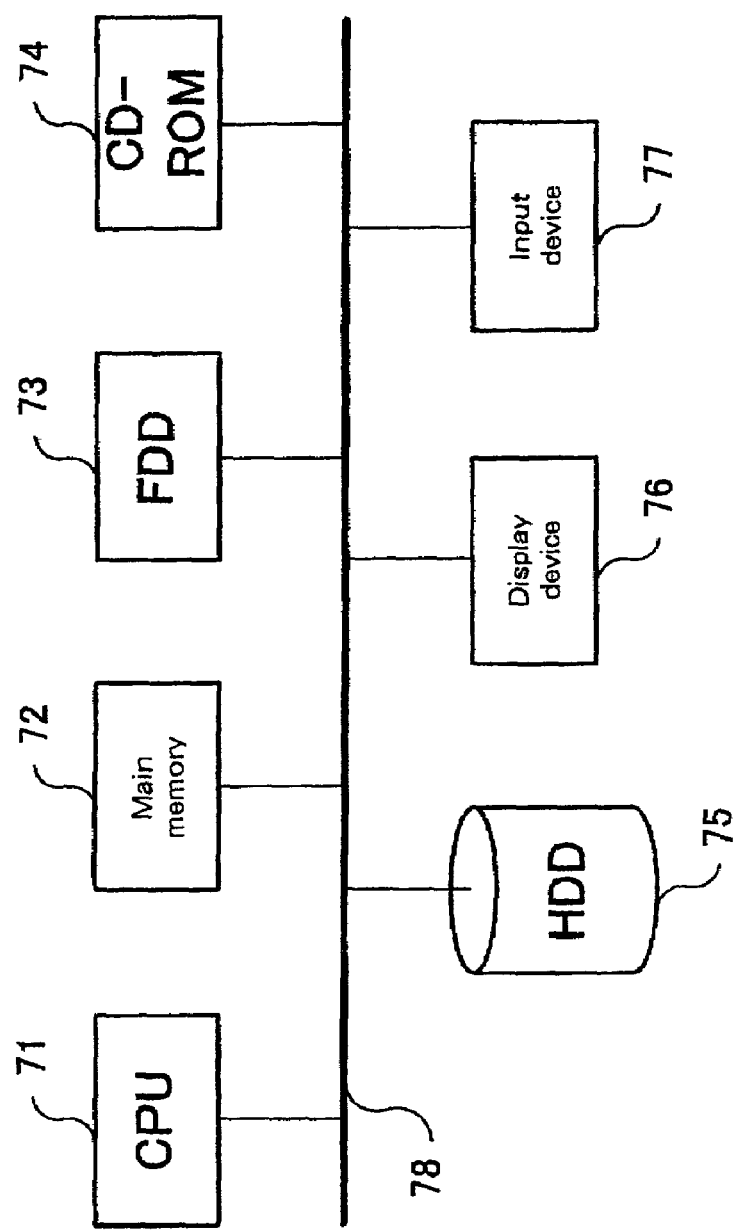
FIG. 11 is a schematic diagram for explaining the configuration of a computer system used as a spatial data mining apparatus.

FIG. 11 is a schematic diagram for explaining the arrangement of a computer system that constitutes a spatial data mining apparatus. The processing algorithm of the embodiment can also be provided as a program to be executed by the computer system in FIG. 11. The processing program is stored on a hard disk drive (HDD) 75, is loaded into a main memory 72 for execution, and is executed by a CPU 71. The HDD 75 also holds a large database, including such spatial information as addresses, and the processing program is used to access the database. Geographical information obtained by the geographical information system (GIS) and the distance or the orientation optimized using calculations are provided for a user by a display device 76. The user employs an input device 77 to enter desired objective functions or data output commands. The input device 77 includes a keyboard, a mouse, a pointing device or a digitizer. The output results can be stored on a floppy disk loaded in a floppy disk drive (FDD) 73, an auxiliary storage device, from which new data can also be obtained. Further, a CD-ROM drive 74 can also be employed for data input.

The computer program that implements the processing algorithm of this embodiment can be stored on a storage medium, such as a floppy disk or a CD-ROM, which may be carried by a user. In this case, the data extraction section of an ordinary database search-program or a program provided only for the display of data on the display device 76 may be stored on the HDD 75 in advance. Therefore, it is normal for other sections to be distributed using various types of storage media. A communication device (not shown) may be connected to a bus 78, so that a remote database can be employed to perform the processing, or so that the processing results can be transmitted to a remote area. That is, a large database in which spatial information, such as addresses, is included can also be provided outside the configuration shown in FIG. 11.

The configuration of the embodiment will now be described in detail while referring to a functional block diagram.

Figure 12:
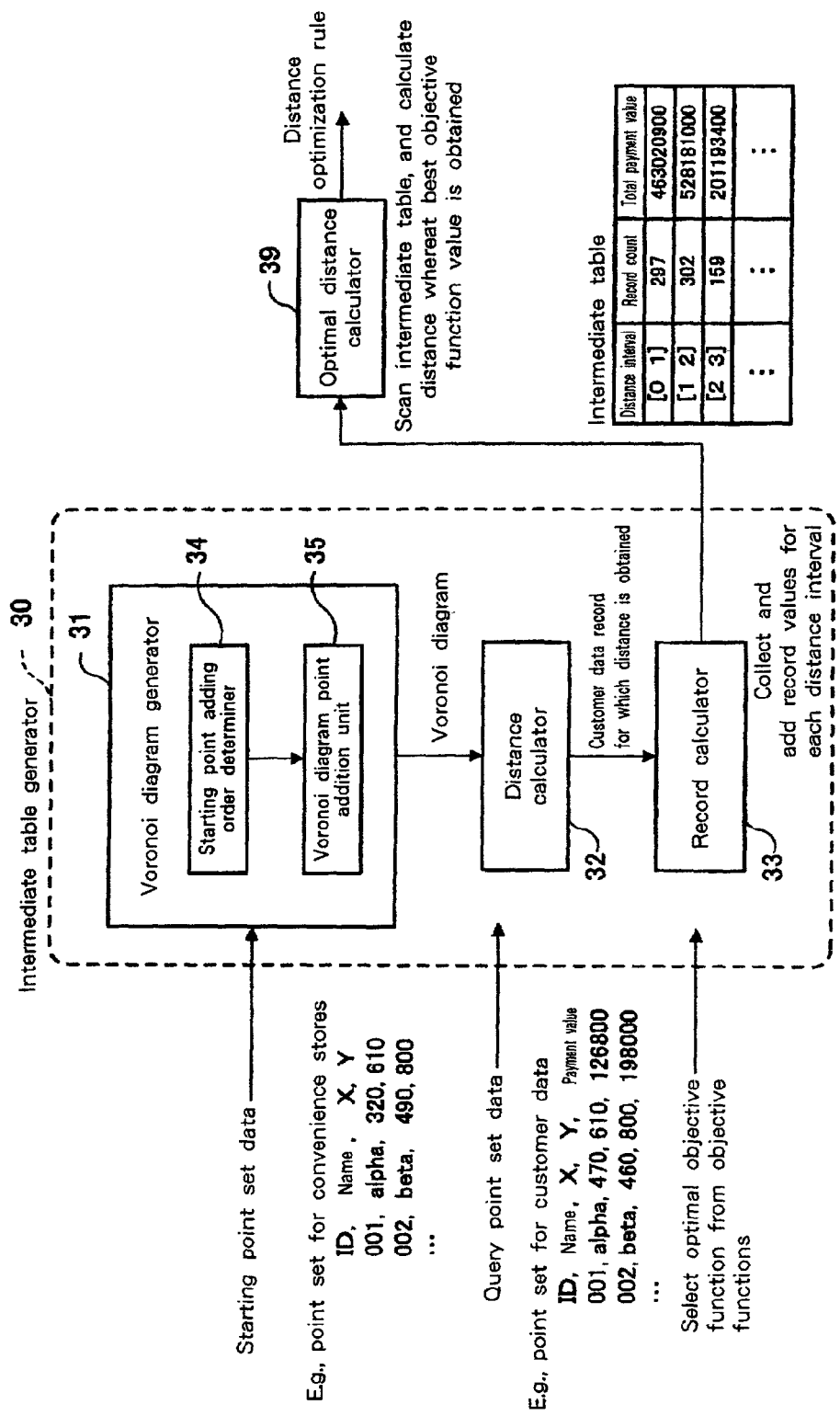
FIG. 12 is a block diagram for explaining the configuration of the spatial data mining system according to the embodiment.

FIG. 12 is a block diagram for explaining the configuration of a spatial data mining system according to this embodiment. In FIG. 12, the arrangement of the CPU 71 in FIG. 11 is shown in detail. The CPU 71 mainly comprises an intermediate table generator 30 and an optimal distance calculator 39. The intermediate table generator 30 includes a Voronoi diagram generator 31, a distance calculator 32 and a record calculator 33. The Voronoi diagram generator 31 receives data for a set of starting points, such as a set of points for convenience stores, that consists of IDs, names and coordinates on a map, and employs a start point adding order determiner 34 and a Voronoi diagram point addition unit 35 to generate a voronoi diagram. The distance calculator 32 receives data for a set of query points, such as a set of points representing customer data, that consists of IDs, names, coordinates on a map and payment values, and generates a customer data record, or a set of customer data records, for which distance is obtained. The record calculator 33 employs the customer data record output by the distance calculator 32 to collect and add record values required for the optimization of each distance. As a result, an intermediate table shown in FIG. 12 is prepared. In this table, the record value and the total payment value are shown for each distance block. The optimal distance calculator 39 scans the intermediate table to obtain the distance at which the best objective function value is obtained, and outputs this distance as the distance optimization rule.

The functions of the starting point adding order determiner 34 of the Voronoi diagram generator 31 will now be described while referring to FIGS. 13 and 14.

Figure 13:
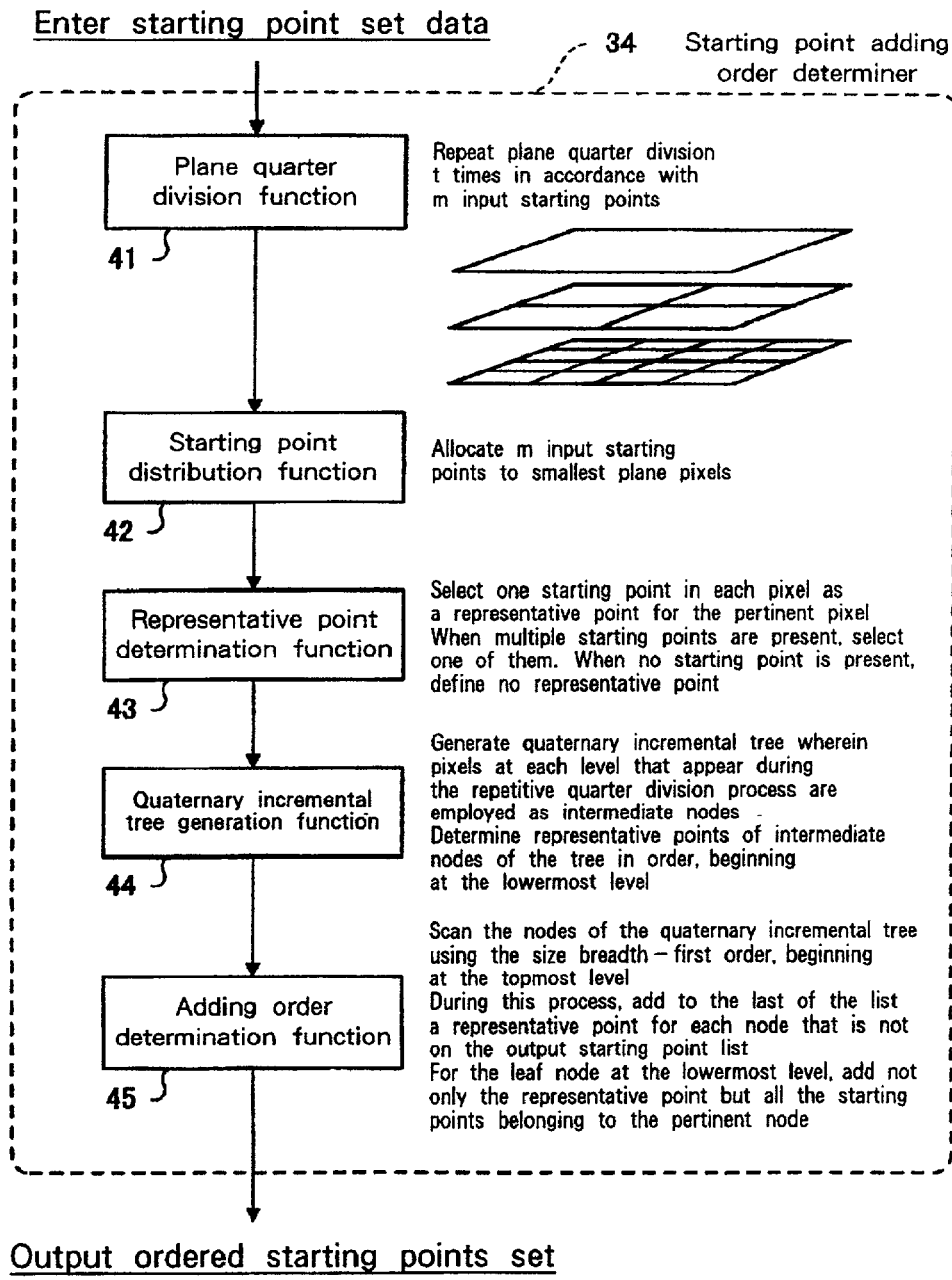
FIG. 13 is a block diagram for explaining the arrangement of a starting point adding order determiner in a Voronoi diagram generator of FIG. 12.

FIG. 13 is a block diagram for explaining the configuration of the starting point adding order determiner 34 of the Voronoi diagram generator 31. The starting point adding order determiner 34 includes a plane quarter division function 41, a starting point distribution function 42, a representative point determination function 43, a quaternary incremental tree generation function 44 and an adding order determination function 45. The plane quarter division function 41 receives all the data for a set of starting points, and repeats the plane quarter division $t(t=m^{1/2}-1)$ times, in accordance with the input starting point count m. That is, while one pixel at each level is divided by four, it is substantially preferable that each pixel include one starting point.

Figure 14:
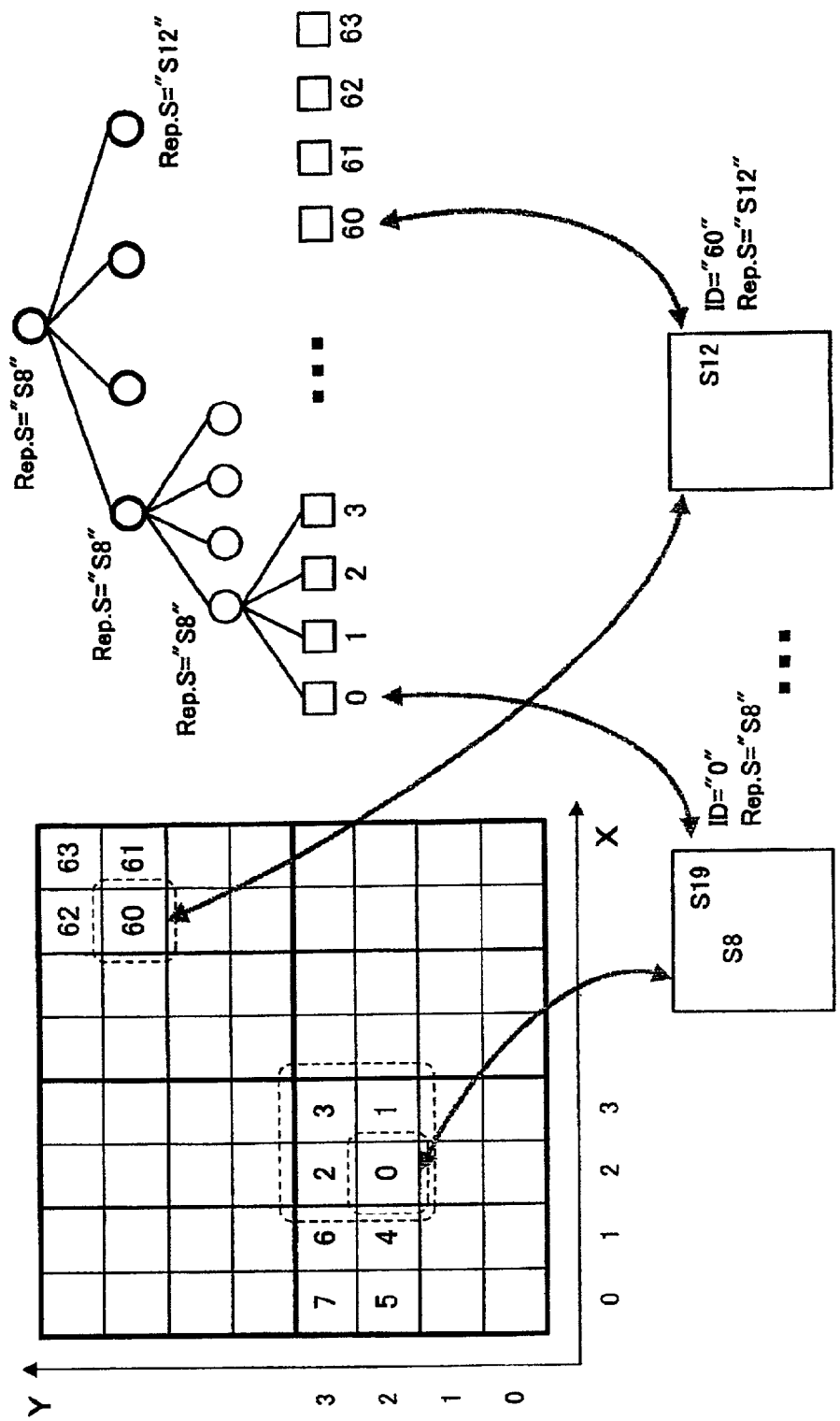
FIG. 14 is a diagram for explaining divided plane pixels and a quaternary incremental tree that is generated.

FIG. 14 is a diagram for explaining divided plane pixels and a quaternary incremental tree that is prepared. As is shown in FIG. 14, the numbers are provided for pixels divided by the plane quarter division function 41. In this example, 64 pixels 0 to 63 are obtained using a depth of 3. The starting points distribution function 42 in FIG. 13 allocates m input starting points to the smallest divided planes (0 to 63). In FIG. 14, starting points 8 (S8) and 19 (S19) are allocated for a pixels 0, and a starting point 12 (S12) is allocated for a pixels 60. The representative point determination function 43 in FIG. 13 selects one of these starting points in each pixel as the representative point for the pertinent pixel. For example, the starting point 12 (S12) is selected for the pixels 60 in FIG. 14. When multiple starting points are present, an arbitrary point is selected (e.g., a starting point 8 (S8) is selected for the pixel 0). When there is no starting point, no representative point is selected.

The quaternary incremental tree generation function 44 in FIG. 13 prepares a quaternary incremental tree wherein the pixels at individual levels (not the lowermost level), which appear during the repetitive quarter division process, serve as intermediate nodes (see the diagram on the right in FIG. 14). Furthermore, the representative points of the intermediate nodes are determined beginning with the intermediate node at a lower level of the tree. In FIG. 14, one of the representative points of the child nodes for the individual intermediate nodes is regarded as the representative point, and the starting point 8 (S8) is sequentially selected. The adding order determination function 45 in FIG. 13 scans the nodes of the quaternary incremental tree in the breadth-first order, beginning with the node at the topmost level. In other words, the nodes are not scanned along the depth (the depth priority order), but transversely at each level. During this process, a representative point that is not yet on the output starting point list for each node is added at the last of the list. For the leaf node at the lowermost level, not only the representative point, but also all the starting points that belong to the pertinent node and that have not yet been entered on the list are added. That is, in the example in FIG. 14, the starting point 19 (S19) for the pixels 0 is added. Through this processing, the set of numbered starting points is output by the starting point adding order determiner 34 to the Voronoi diagram point addition unit 35 in FIG. 12.

Figure 15:
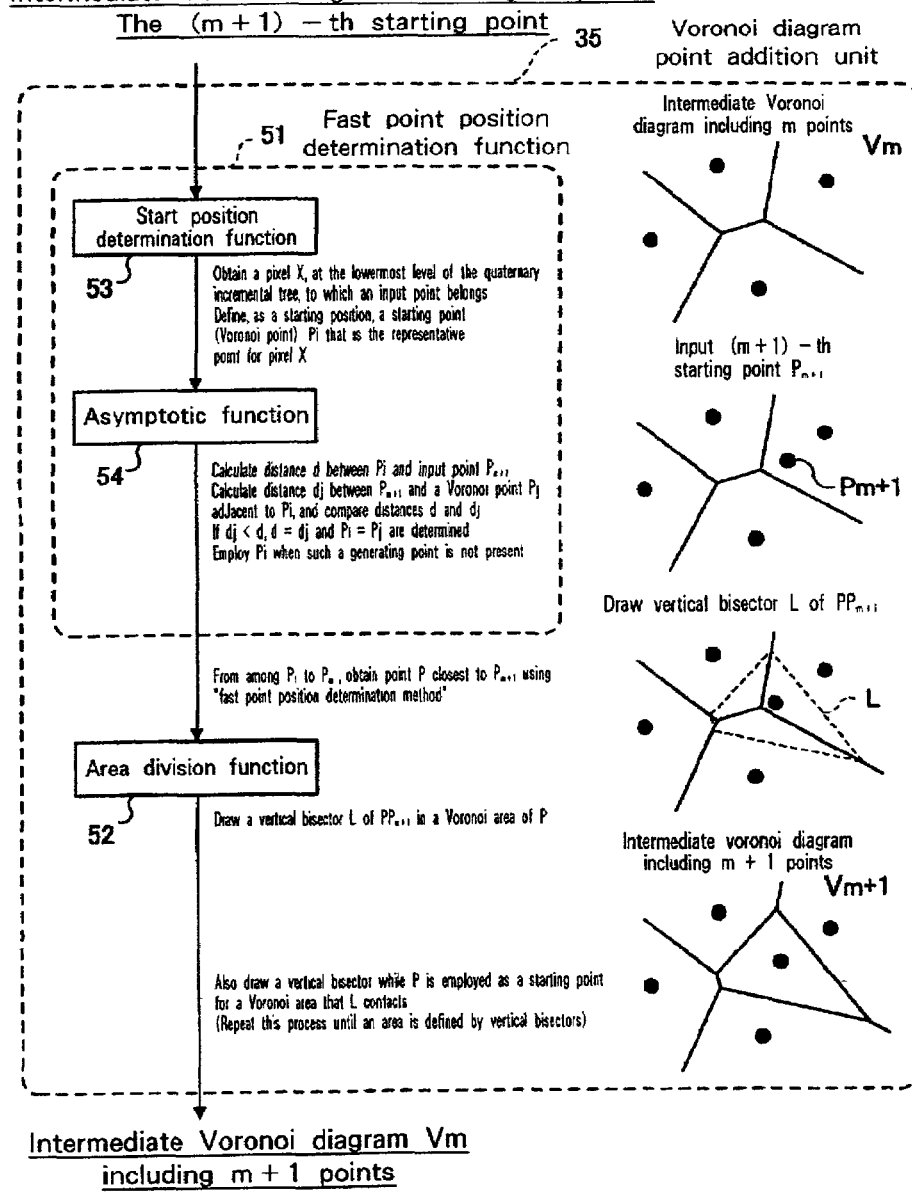
FIG. 15 is a block diagram for explaining the structure of a Voronoi diagram addition unit in the Voronoi diagram generator in FIG. 12.

FIG. 15 is a block diagram for explaining the arrangement of the Voronoi diagram point addition unit 35 of the Voronoi diagram generator 31 in FIG. 12. The Voronoi diagram point addition unit 35 mainly includes a fast point position determination function 51 and an area division function 52. The fast point position determination function 51 has a starting position determination function 53 and an asymptotic function 54, and obtains, among points $P_1$ to $P_m$, the closest point P to the point $P_{m+1}$ provided by the "fast point position determination method". The starting position determination function 53 obtains a pixel X, at the lowermost level of the quaternary tree, to which an input point belongs, and defines, as the starting point, the point (Voronoi point) Pi that is the representative point of the pixel X. If no representative point is selected, the representative point of the parent node is defined as the starting point. The asymptotic function 54 calculates the distance d between the point Pi and the input point $P_{m+1}$. The distance dj between the point $P_{m+1}$ and each Voronoi point Pj adjacent to the point Pi is then calculated, and is compared with the distance d. If dj<d, d=dj and Pi=Pj are determined. If such an adjacent generating point is not present, Pi is determined to be the starting point, and the representative point for the pixel X is defined as the point Pi. As is shown on the right in FIG. 15, the area division function 52 draws a vertical bisector L of $PP_{m+1}$ in the Voronoi area of the point P. Further, when the starting point of the Voronoi area that the bisector L contacts is defined as a point P, a vertical bisector is also drawn. This process is repeated until an area is defined by vertical bisectors, so that the intermediate Voronoi diagram $V_{m+1}$, which includes m+1 points, is obtained as is shown on the right in FIG. 15.

The intermediate table generator 30 in FIG. 12 outputs customer data records for which the distance is obtained, in the above described manner, by the distance calculator 32, which uses the data for a set of query points and the Voronoi diagram that is thus generated by the voronoi diagram generator 31. That is, using the fast point position determination method, the Voronoi point closest to the input point is extracted from the query point record for the query point set and the intermediate Voronoi diagram $V_{m+1}$. Then, the distance between the query point record and the Voronoi point is obtained, and the query point record is output with the obtained distance. Thereafter, as was described above, the intermediate table, for which the record values are collected and added for each distance block by the record calculator 33, is output by the intermediate table generator 30. The information for the intermediate table is stored on HDD 75, for example.

The optimal distance calculator 39 employs this intermediate table to calculate the optimal distance. For example, for the customer data in the query point set data in FIG. 12, the payment value is accumulated in order, beginning with the record for the smallest distance, and during this process, the distance that provides the highest "accumulated payment values/accumulated records" value is recorded. At this time, generally, during the accumulation process, an intermediate value located between the record providing the maximum value and the distance value for the next record in the intermediate table is recorded as a temporary optimal distance. As is described above, while the temporary optimal distance that provides the maximum value for the objective function is maintained, the intermediate table is scanned once, so that the optimal distance can be obtained. The obtained optimal distance can be displayed by the display device 76, as is shown in FIG. 1.

As is shown in FIG. 2, only the data inside each circle that are required for the optimization are included in the intermediate table of the orientation optimization algorithm. That is, the distance from the reference point is calculated for each of the records (query points) in the database that are associated with the spatial information, and the angle formed by a reference point and a query point that falls within the radius of the circle is calculated. The distance is entered in the record for the intermediate table in accordance with the obtained angle value. If circles required for the search overlap each other, a query point may be included in multiple circles at the same time. Thus, to prepare the intermediate table, one of the following two methods is employed:

An angle based on each reference point is added to all the corresponding records in the intermediate table.

Only an angle relative to the reference point located at the shortest distance is added to a corresponding record in the intermediate table.

The orientation optimization intermediate table includes as attributes, at equal intervals, angle intervals in the ascending or descending order. For example, when the average annual income is employed as the objective function, the intermediate table includes the total annual income and the record count required for this calculation.

| total annual income | angle interval | record count |
|---|---|---|
| 8,400,000 | 0 to 10 | 6 |
| 5,000,000 | 10 to 20 | 1 |
| 7,000,000 | 20 to 30 | 3 |
| 5,800,000 | 30 to 40 | 3 |

Thereafter, the optimal orientation range for the objective function is determined using the intermediate table. For example, when the indexes of the records in the ascending order of the angles are defined as s and t, the average income $X[s, t]$ for the interval $[s, t]$ is represented as $X[s, t]=$"the total of incomes of the records included in the interval $[s, t]$÷the number of salary income persons in the interval $[s, t]$".

This, then, is a problem for obtaining the interval $[s, t]$ for optimizing $X[s, t]$. While the interval algorithm can be performed using $O(n)$, where n denotes the intermediate table size, in this embodiment, an algorithm is employed that takes into account the discontinuity at the degree of 0 that occurs when an angle is represented as a numerical value. For example, for records that are sorted in the intermediate table, the annual income and the number of records are accumulated, and:

a record position at which a $\Sigma$ annual income/a $\Sigma$ record count is maximized, and the $\Sigma$ annual income and the $\Sigma$ record count at the position t, and a record position at which a $\Sigma$ annual income/a $\Sigma$ record count is minimized, and the $\Sigma$ annual income and the $\Sigma$ record count at the position s are stored. The optimal orientation can be acquired by using the value obtained by performing a scan of the table of up to 360 degrees. When s<t, the optimal interval is provided as $[s, t]$, with no 0 in between, and the average annual income can be obtained quickly. If t<s, the optimal interval is $[s, t]$, with a 0 in between, and the average annual income can be obtained from the total number of query points and the total of the annual incomes relative to the query points. The obtained results can then be displayed on a map by the display device 76, as is shown in FIG. 2.

According to the embodiment of the present invention, the definition of the distance (either the Euclidean distance (substantially, the linear time in this case) or the network distance (the polynomial time in this case)), the definition of the orientation (direction), the definition of a set of starting points, and the definition of the objective function are designated as input parameters, as needed. Thus, the optimization rules can be calculated and listed. For example, if the following is designated:

distance: Euclidean distance
definition of a set of starting points:
post offices (ALL, each type), schools (ALL, each type)
definition of an objective function:
customers (maximized distance for average annual incomes of customers having a support rate of S or higher)
customers (maximized distance for amount of mutual information for each sex), the optimization rules for the objective functions from the set of starting points are, for example:

"within X from post offices to maximize the average annual income (support rate s, average annual income x)" and "within X from universities to maximize mutual information amount for each sex (support rate s, entropy gain g)"

are listed in accordance with the combination of the above definitions. Thus, in accordance with the data in which a user is interested, the user can sort or file these rules. In addition, for a matter of special interest, the optimization rule can be displayed on the map by the GUI, as is shown in FIG. 1 or 2.

As is described above, according to the present invention, a spatial data mining technique can be provided for obtaining a distance or an orientation requested by many analyzation businesses, without having to define the distance or the orientation in advance in order to introduce a spatial correlative rule.

The invention claimed is:

1. A spatial data mining apparatus for calculating an optimal distance from a database, wherein spatial information, including addresses, is stored, the apparatus comprising:

input means for inputting of an objective function required for the optimization of a distance;

intermediate table generation means for employing in said database starting point data and query point data for calculating the distances between each starting point and each query point and generating an intermediate table, wherein said intermediate table generation means comprises Voronoi diagram preparation means for preparing a Voronoi diagram by using said starting point data in said database; distance calculation means for employing said voronoi diagram, prepared by said Voronoi diagram preparation means, and said query point data in said database to calculate distances between individual starting points and individual query points and to generate data records; and individual distance calculation means for selecting an optimization function from the objective function, and adding together record values, collected from said data records, that are required for optimization of each of said distances; and optimal distance calculation means for calculating a distance, based on said intermediate table generated by said intermediate table generation means, in order to optimize the value of said objective function that is entered by said input means, wherein said Voronoi diagram preparation means repeats plane quarter division in accordance with the number of starting points that are entered, sorts said starting points into end plane pixels obtained by division and selects one starting point in each of said end plane pixels as a representative point for the pertinent pixel, prepares a quaternary incremental tree with pixels at individual levels being defined as intermediate nodes, scans said individual nodes of said quaternary incremental tree in the breadth-first order, beginning at the topmost level, and outputs a set of starting points that are positioned in ranks.

2. A spatial data mining apparatus for calculating an optimal orientation for a database, which includes spatial information, including addresses, the apparatus comprising:

input means for inputting of an objective function required for the optimization of an orientation;

intermediate table generation means for employing, based on starting point data and query point data in said database, angles of 0 degrees from starting points in a specific direction to generate an intermediate table in which the orientation of the locations of said query points are included, wherein said intermediate table generation means includes:

Voronoi diagram preparation means for preparing a Voronoi diagram by using said starting point data in said database;

distance calculation means for employing said Voronoi diagram prepared by said Voronoi diagram preparation means and said query point data in said database to calculate distances between individual starting points and individual query points;

orientation calculation means for calculating, based on said distances obtained by said distance calculation means, orientations of said starting points with said query points that fall within a designated distance upper limit, and storing said orientations as data records for said intermediate table; and individual orientation calculation means for selecting an optimization function from the objective function, and collecting and adding record values, from said data records, that are required for optimization of each of said distances; and optimal orientation calculation means for calculating an orientation, based on said intermediate table generated by said intermediate table generation means, for optimizing the value of said objective function that is entered by said input means, wherein Voronoi diagram preparation means repeats plane quarter division in accordance with the number of starting points that are entered, sorts said starting points into end plane pixels obtained by division and selects one starting point in each of said end plane pixels as a representative point for the pertinent pixel, prepares a quaternary incremental tree with pixels at individual levels being defined as intermediate nodes, scans said individual nodes of said quaternary incremental tree in the breadth-first order, beginning at the topmost level, and outputs a set of starting points that are positioned in ranks.

* * * * *